US012457455B2

(12) United States Patent
Zhang

(10) Patent No.: US 12,457,455 B2
(45) Date of Patent: Oct. 28, 2025

(54) SPEAKER MODULE

(71) Applicant: AAC Microtech (Changzhou) Co., Ltd., Jiangsu (CN)

(72) Inventor: Chao Zhang, Changzhou (CN)

(73) Assignee: AAC Microtech (Changzhou) Co., Ltd., Changzhou (CN)

(*) Notice: Subject to any disclaimer, the term of this patent is extended or adjusted under 35 U.S.C. 154(b) by 197 days.

(21) Appl. No.: 18/518,409

(22) Filed: Nov. 22, 2023

(65) Prior Publication Data

US 2024/0406638 A1 Dec. 5, 2024

Related U.S. Application Data

(63) Continuation of application No. PCT/CN2023/096714, filed on May 29, 2023.

(51) Int. Cl.
*H04R 9/06* (2006.01)
*H04R 7/04* (2006.01)

(52) U.S. Cl.
CPC ................. *H04R 9/06* (2013.01); *H04R 7/04* (2013.01)

(58) Field of Classification Search
CPC ........ H04R 9/06; H04R 7/04; H04R 2400/11; H04R 2499/11; H04R 9/025
See application file for complete search history.

(56) References Cited

FOREIGN PATENT DOCUMENTS

CN 112165662 B * 9/2021 ............... H04R 9/06

* cited by examiner

*Primary Examiner* — Tuan D Nguyen
(74) *Attorney, Agent, or Firm* — Wiersch Law Group

(57) ABSTRACT

The present disclosure discloses a speaker module including a housing and a speaker unit received in the housing, comprising: a frame, a magnet system, including: a yoke fixed to the frame; and a first magnet fixed to the yoke; a vibration system mounted on the frame, including: a diaphragm fixed to the frame; and a coil fixed to the diaphragm and inserted into the magnetic gap; a connector surrounding the yoke and configured to connect the yoke with frame; wherein the housing includes an upper cover enclosing a front cavity with the diaphragm, a bottom cover fixed to the yoke, and a side wall enclosing the receiving space with the upper cover and the bottom cover; a surface of the yoke away from the first magnet is fixed to the bottom cover; the speaker module in the present disclosure has high sealability.

9 Claims, 7 Drawing Sheets

A-A

SPEAKER MODULE

FIELD OF THE PRESENT DISCLOSURE

The present disclosure relates to electric-acoustic conversion technologies, especially relates to a speaker module applied in portable mobile terminals.

DESCRIPTION OF RELATED ART

With the development of the portable mobile terminal technologies, users have increasingly high requirements for the sound quality of portable mobile terminals. And a speaker module in portable mobile terminals is one of the necessary conditions to achieve this high-quality sound effect, which is configured to achieve conversion between electric signal and acoustic signal.

In related art, the speaker module includes a housing having a receiving space and a speaker unit received in the housing. The speaker unit includes a frame and a vibration system and a magnet system mounted on the frame. For a purpose of height reduction, the yoke is exposed outside the housing through a hole on the housing. The edge of the yoke is glued to the housing to seal the speaker module. However, the glue between the yoke and housing is prone to increase the height of the speaker module to affect miniaturization negatively. Besides, when the glue is insufficient to fill the gap between the yoke and the housing, air leakage may occur to harm the sound performance of the speaker module.

Therefore, it is necessary to provide an improved speaker module to overcome the problems mentioned above.

SUMMARY OF THE INVENTION

One object of the present disclosure is to provide a speaker module with higher sealability.

The speaker module includes a housing, having a receiving space; a speaker unit received in the receiving space, comprising: a frame, a magnet system having a magnetic gap, including: a yoke fixed to the frame; and a first magnet fixed to the yoke; a vibration system mounted on the frame, including: a diaphragm fixed to the frame; and a coil fixed to the diaphragm and inserted into the magnetic gap; a connector surrounding the yoke and configured to connect the yoke with frame; wherein the housing includes an upper cover enclosing a front cavity with the diaphragm, a bottom cover fixed to the yoke, and a side wall enclosing the receiving space with the upper cover and the bottom cover; an inner cavity isolated from the front cavity is jointly enclosed by the yoke, the connector, the frame, and the diaphragm; a surface of the yoke away from the first magnet is fixed to the bottom cover.

As an improvement, the yoke includes a body portion configured to support the first magnet, and an edge portion surrounding the body portion; a thickness of the edge portion is smaller than a thickness of the body portion; a surface of the body portion away from the first magnet is fixed to the bottom cover; the edge portion is spaced apart from the bottom cover.

As an improvement, the connector includes a first fixation portion fixed to the yoke, a second fixation portion fixed to the frame, and a central portion connecting the first fixation portion and the second fixation portion; the first fixation portion is sandwiched between the edge portion and the bottom cover.

As an improvement, a total thickness of the edge portion and the first fixation portion is equal to the thickness of the body portion.

As an improvement, a surface of the first fixation portion away from the diaphragm is aligned with a surface of the body portion away from the first magnet.

As an improvement, a total thickness of the edge portion and the first fixation portion is smaller than the thickness of the body portion.

As an improvement, a groove is formed by denting a surface of the bottom cover facing the yoke away from the yoke; at least part of the body portion is received in the groove.

As an improvement, a depth of the groove is smaller than a thickness of the bottom cover.

As an improvement, an inner edge of the first fixation portion is abutted to the body portion.

BRIEF DESCRIPTION OF THE DRAWINGS

The present disclosure will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

DETAILED DESCRIPTION OF THE EXEMPLARY EMBODIMENT

Figure 1:
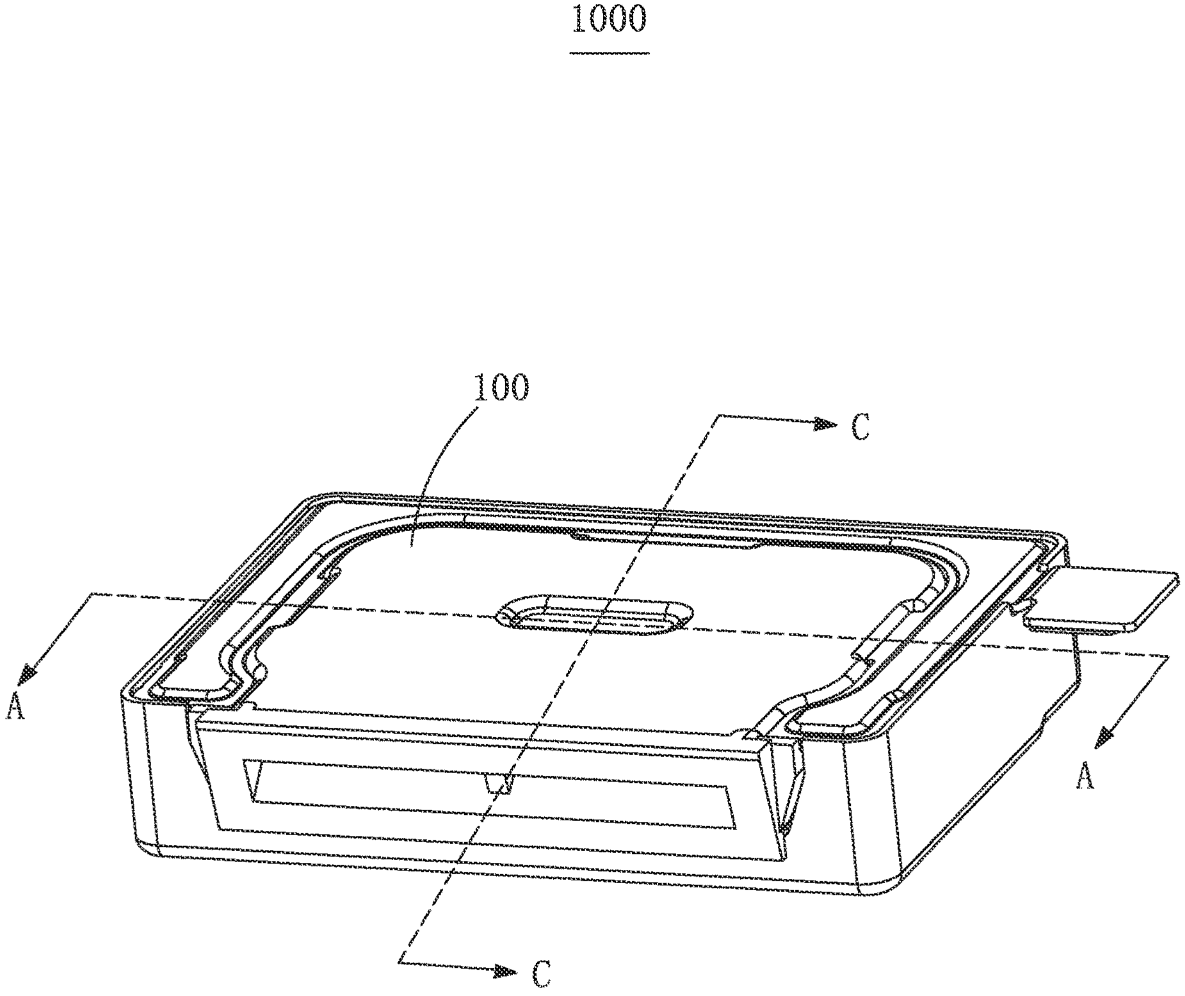
FIG. 1 is an isometric view of a speaker module in accordance with an exemplary embodiment of the present disclosure.
Figure 2:
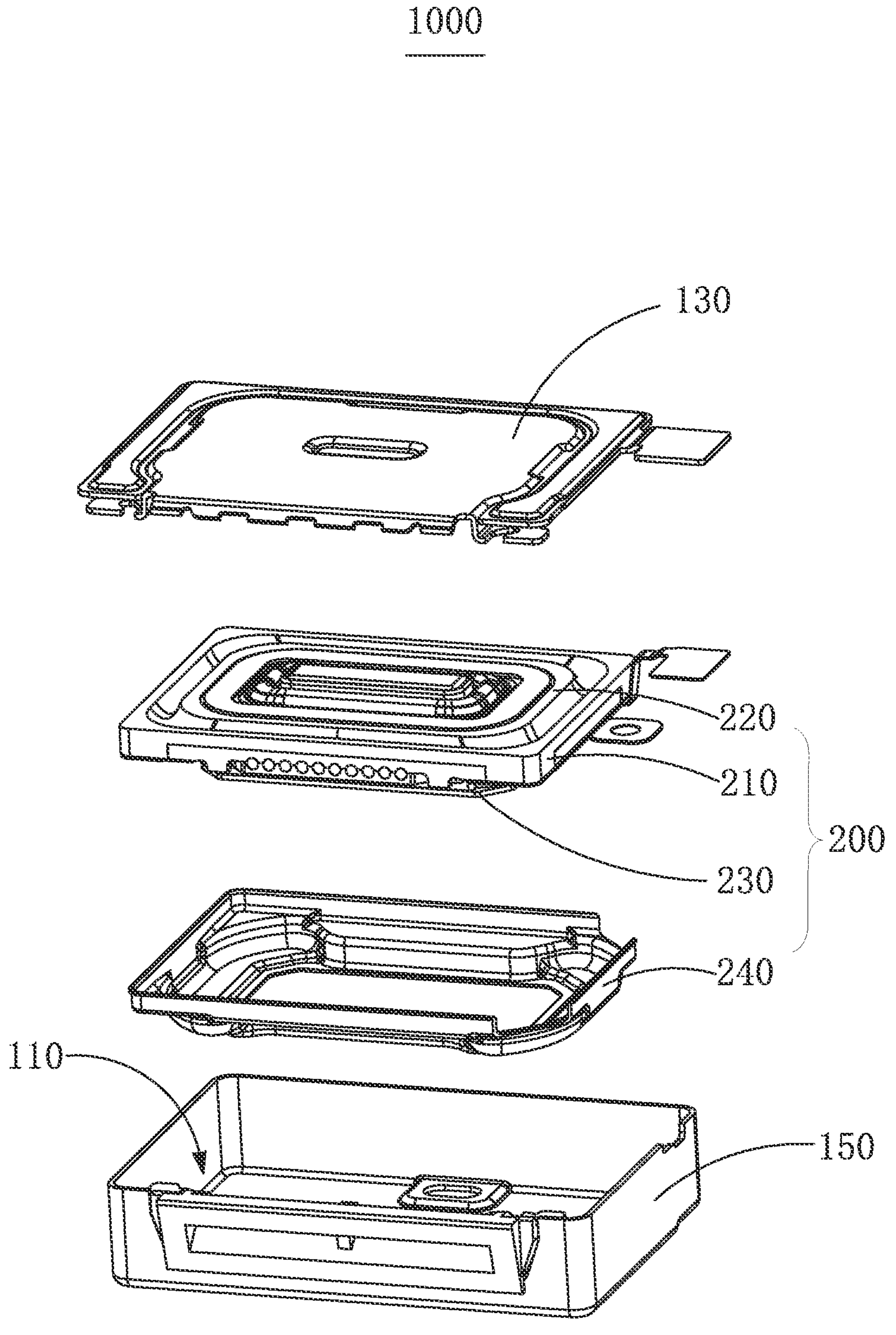
FIG. 2 is a partially exploded view of the speaker module in FIG. 1.
Figure 3:
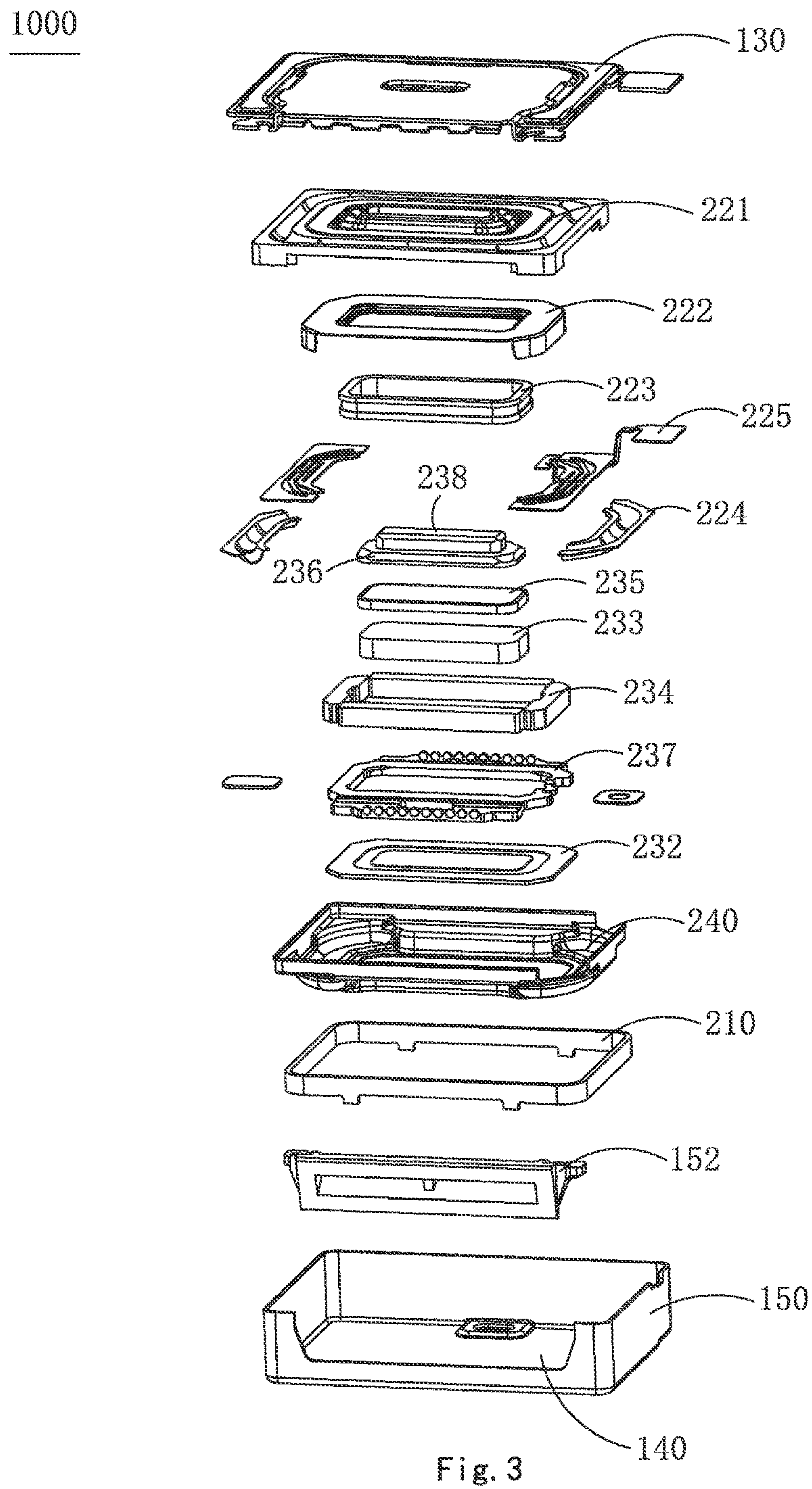
FIG. 3 is an exploded view of the speaker module in FIG. 1.

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Please refer to FIGS. 1-6 together, a speaker module 1000 provided by an exemplary embodiment of the present disclosure includes a housing 100 having a receiving space 110, and a speaker unit 200 received in the receiving space 110.

The speaker unit 200 includes a frame 210, a vibration system 220 mounted on the frame 210, and a magnet system 230 having a magnetic gap 231.

The vibration system 220 includes a diaphragm 221 fixed to the frame 210, a skeleton 222 fixed to the diaphragm 221, a coil 223 inserted into the magnetic gap 231 via the skeleton 222, a support membrane 224 fixed to an end of the coil 223 away from the diaphragm 221, and a conductive member 225 electrically connected the coil 223 and en external circuit.

The magnet system 230 includes a yoke 232 fixed to the frame 210, a first magnet 233 fixed to the yoke 232, a second magnet 234 spaced apart from the first magnet 233 forming the magnetic gap 231, a first magnetic plate 235 fixed on a surface of the first magnet 233 away from the yoke 232, a third magnet 236 fixed on a surface of the first magnetic plate 235 away from the first magnet 233, a second magnetic plate 237 fixed to a surface of the second magnet 234 away from the yoke 232, and a fourth magnet 238 fixed to a surface of the third magnet 236 away from the first magnetic plate 235; along a vibration direction, a projection area of the fourth magnet 238 is smaller than a projection area of the third magnet 236; the second magnetic plate 237 is fixed to the frame 210 to support the magnet system 230 on the frame 210.

The housing 100 includes an upper cover 130 enclosing a front cavity 120 with the diaphragm 221, a bottom cover 140 fixed to the yoke 232, and a side wall 150 enclosing the receiving space 110 with the upper cover 130 and the bottom cover 140. Specifically, a surface of the yoke 231 away from the first magnet 233 is fixed to the bottom cover 140, thus improving the fixation stability of the magnet system 230. Furthermore, a sound channel 151 is provided on the side wall 150 to transmit the sound signal generated by the diaphragm 221 outside through the front cavity 120 and the sound channel 151. In one embodiment, the sound channel 151 is formed on an injection molded member 152 inserted into the side wall 150. Moreover, the speaker unit 200 further includes a connector 240 surrounding the yoke 232 and configured to connect the yoke 232 with frame 210. An inner cavity 160 isolated from the front cavity 120 is jointly enclosed by the yoke 232, the connector 240, the frame 210, and the diaphragm 221. A rear cavity 170 isolated from the front cavity 120 and the inner cavity 160 is jointly enclosed by the connector 240, the bottom cover 140, the side wall 150, and the upper cover 130. It should be understood that the connector 240 is commonly an air-permeable isolation member. Usually, the rear cavity 170 is configured to fill sound-absorbing material to improve the acoustic ability of the speaker module 1000. The connector 240 is configured to prevent the sound-absorbing material entering the inner cavity 160 of the speaker unit 200.

Specifically, the yoke 232 includes a body portion 2321 configured to support the first magnet 233, and an edge portion 2322 surrounding the body portion 2321; a thickness of the edge portion 2322 is smaller than a thickness of the body portion 2321; a surface of the body portion 2321 away from the first magnet 233 is fixed to the bottom cover 140. The edge portion 2322 is spaced apart from the bottom cover 140, forming a gap between the bottom cover 140 and the edge portion 2322. A surface of the edge portion 2322 away from the first magnet 233 is aligned with a surface of the body portion 2321 away from the first magnet 233. Furthermore, the connector 240 includes a first fixation portion 241 fixed to the yoke 232, a second fixation portion 242 fixed to the frame 210, and a central portion 243 connecting the first fixation portion 241 and the second fixation portion 242; the first fixation portion 241 is sandwiched between the edge portion 2322 and the bottom cover 140. And, a total thickness of the edge portion 2322 and the first fixation portion 241 is equal to the thickness of the body portion 2321. In this manner, an interval between edge portion 2322 and the bottom cover 140 fully accommodates the first fixation portion 241 of the connector 240 for sealing.

Figure 4:
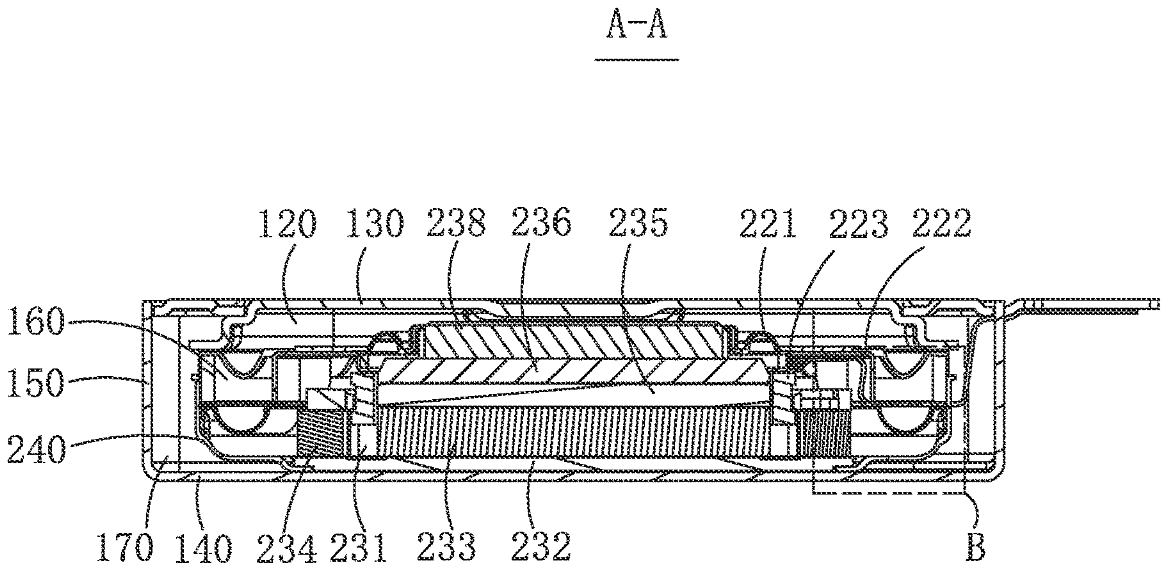
FIG. 4 is a cross-sectional view of the speaker module taken along line A-A in FIG. 1.
Figure 5:
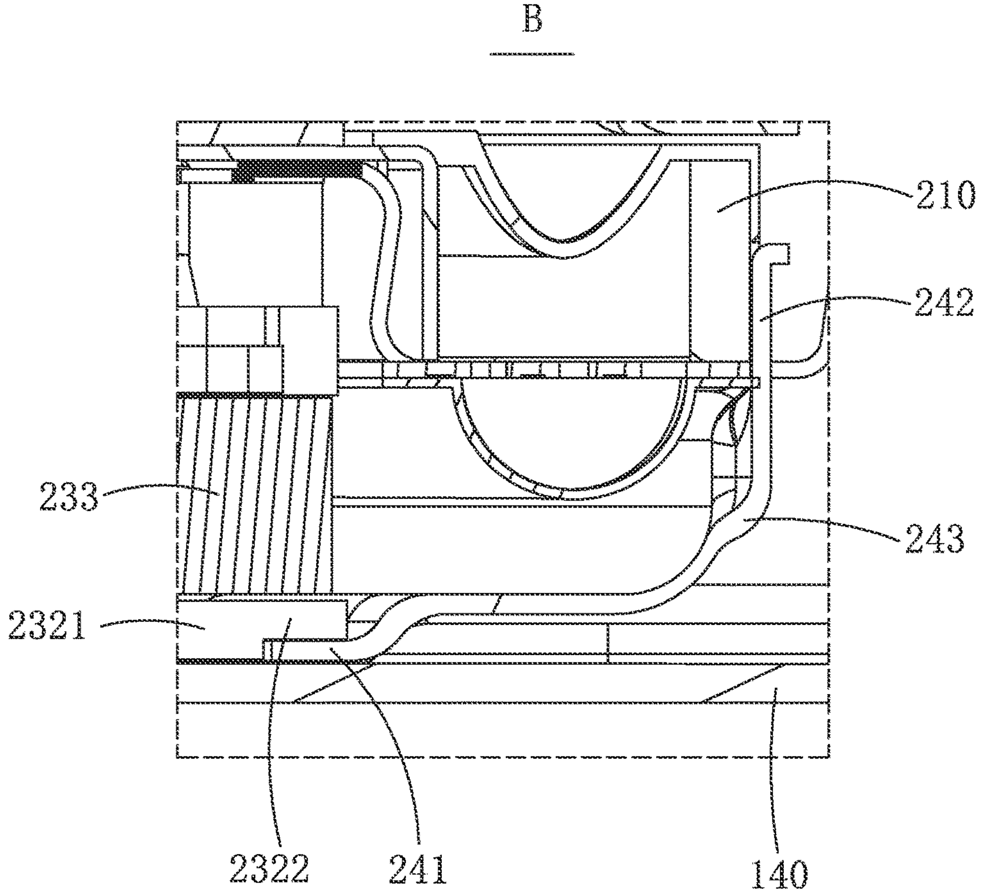
FIG. 5 is an enlarged view of part B in FIG. 4.
Figure 6:
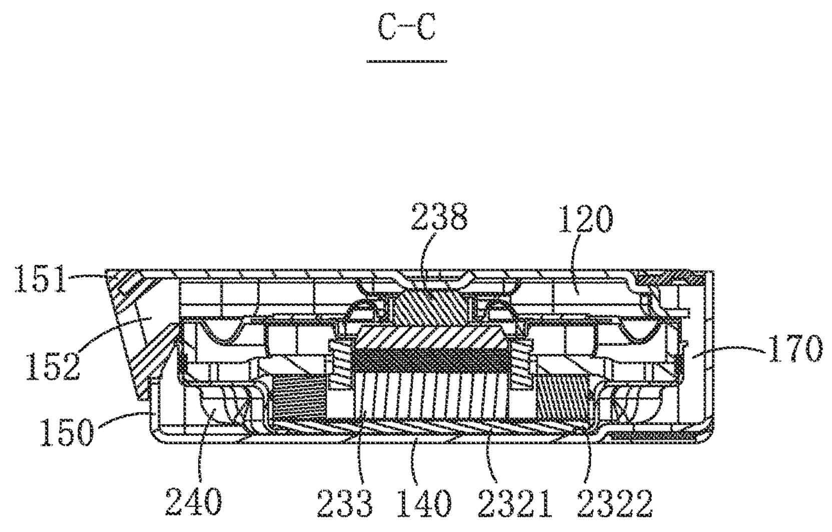
FIG. 6 is a cross-sectional view of the speaker module taken along line C-C in FIG. 1.

As shown in one embodiment is FIGS. 4-5, a surface of the first fixation portion 241 away from the diaphragm 221 is aligned with a surface of the body portion 2321 away from the first magnet 233, thus avoiding air leakage caused by glue accumulation or insufficient glue when the yoke 232 is glued to the bottom cover 140. Therefore, the sealability and acoustic performance of the speaker module 1000 is effectively improved. In addition, without providing a hole on the bottom cover 140, the thickness of the yoke 232 can still be flexibly adjusted to ensure that the speaker module 1000 has a relatively small thickness to ensure miniaturization of the device.

Figure 7:
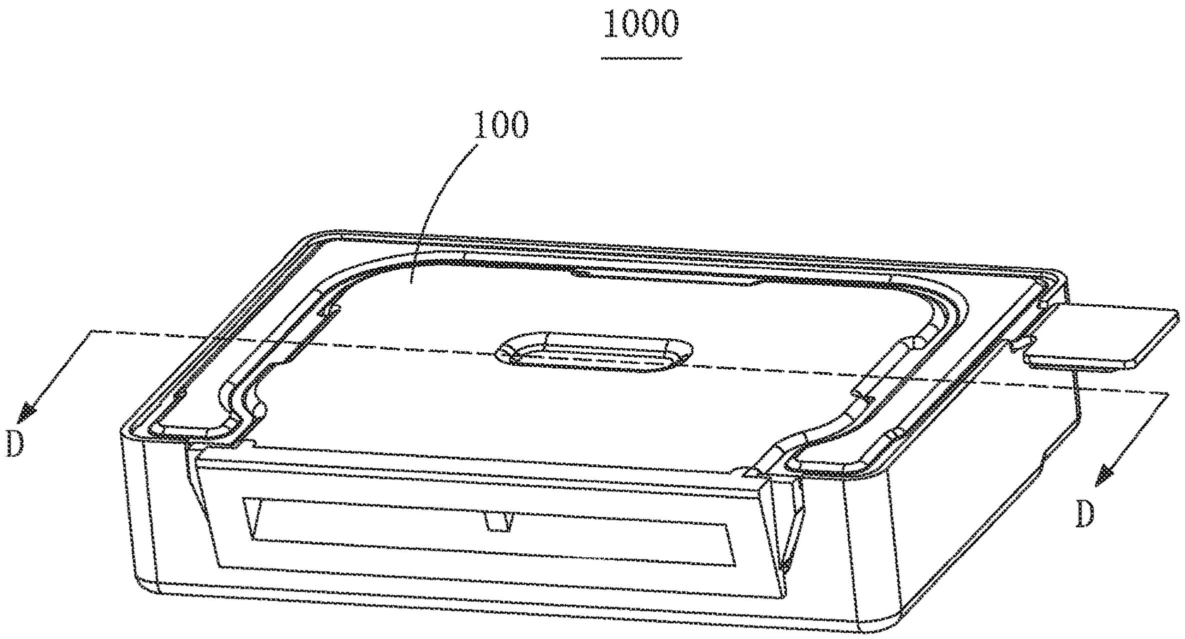
FIG. 7 is an isometric view of a speaker module in accordance with another exemplary embodiment of the present disclosure.
Figure 8:
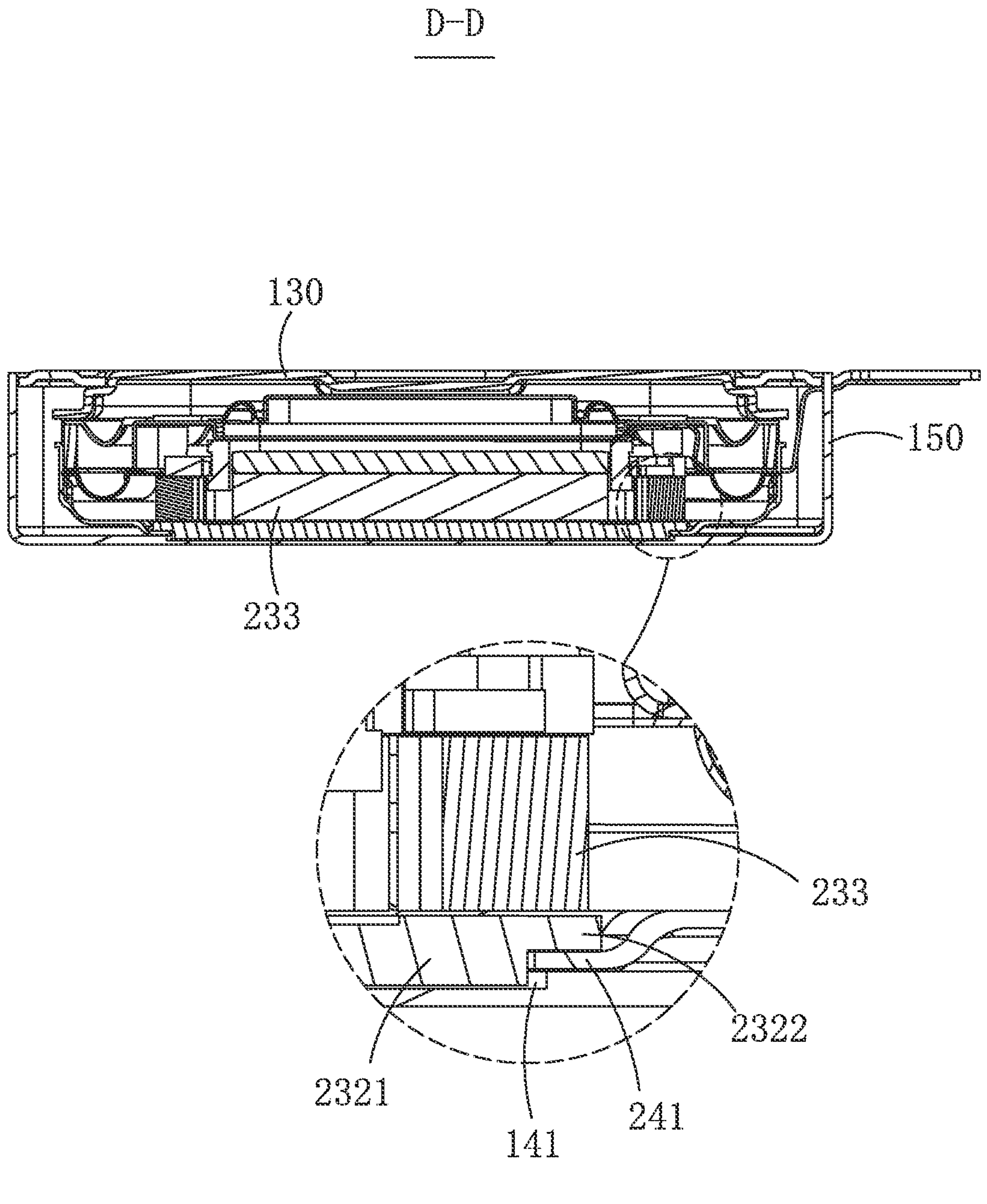
FIG. 8 is a cross-sectional view of the speaker module taken along line D-D in FIG. 7.
Figure 9:
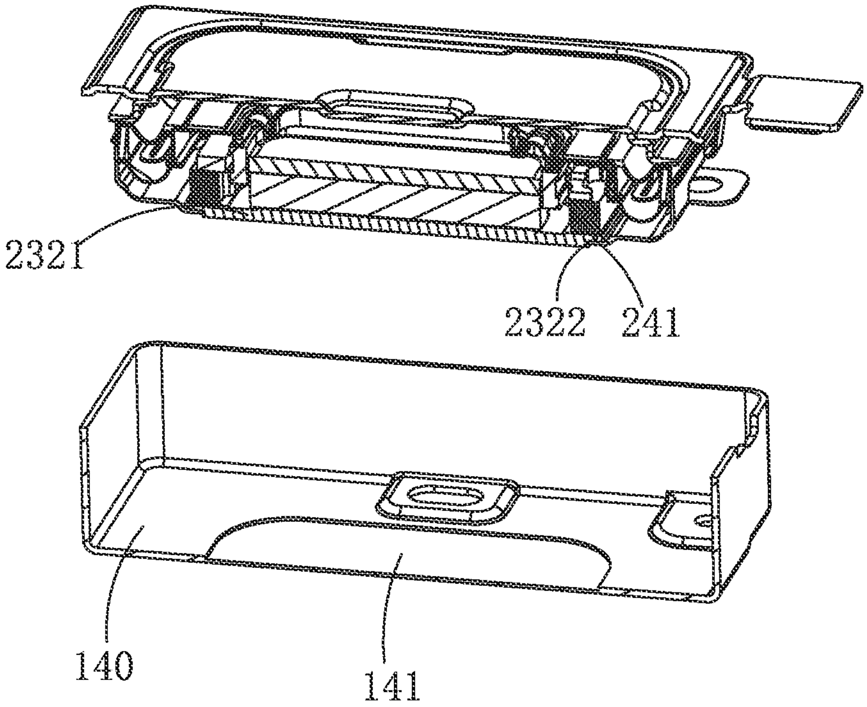
FIG. 9 is an exploded view of the speaker module in FIG. 8.

As shown in FIGS. 7-9, in another embodiment in the present disclosure, a total thickness of the edge portion 2322 and the first fixation portion 241 is smaller than the thickness of the body portion 2321. In the same time, a groove 141 is formed by denting a surface of the bottom cover 140 facing the yoke 232 away from the yoke 232; at least part of the body portion 2321 is received in the groove 141 so that an inner edge of the first fixation portion 241 is abutted to the body portion 2321, thus avoiding air leakage caused by glue accumulation or insufficient glue when the yoke 232 is glued to the bottom cover 140. Therefore, the sealability and acoustic performance of the speaker module 1000 is effectively improved. Furthermore, a depth of the groove 141 is smaller than a thickness of the bottom cover 140. Without providing a hole on the bottom cover 140 or thinning the yoke 232, the speaker module 1000 can also has a relatively small thickness to ensure miniaturization of the device.

Compared with the related art, the speaker module in the present disclosure includes a housing having a receiving space and a speaker unit received in the receiving space. The speaker unit includes a frame, a vibration system mounted on the frame, and a magnet system having a magnetic gap. The magnet system includes a yoke fixed to the frame and a first magnet fixed to the yoke. The housing comprises an upper cover enclosing a front cavity with the diaphragm, a bottom cover fixed to the yoke, and a side wall enclosing the receiving space with the upper cover and the bottom cover. A surface of the yoke away from the first magnet is fixed to the bottom cover. By fixing the yoke to the bottom cover directly, it is flexible to thin the yoke and maintain the original thickness of the bottom cover. Or providing a groove on the bottom cover to accommodate the yoke to make the total thickness of the yoke and the bottom cover consistent, thus effectively ensuring the miniaturization of the speaker module. In addition, it is not necessary to expose the yoke outside the housing, thus avoiding air leakage caused by glue accumulation or insufficient glue when the yoke is glued to the bottom cover and improving the sealability and acoustic performance of the speaker module.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A speaker module comprising:

a housing, having a receiving space;

a speaker unit received in the receiving space, comprising:

a frame, a magnet system having a magnetic gap, comprising:

a yoke fixed to the frame; and a first magnet fixed to the yoke;

a vibration system mounted on the frame, comprising:

a diaphragm fixed to the frame; and a coil fixed to the diaphragm and inserted into the magnetic gap;

a connector surrounding the yoke and configured to connect the yoke with frame; wherein the housing comprises an upper cover enclosing a front cavity with the diaphragm, a bottom cover fixed to the yoke, and a side wall enclosing the receiving space with the upper cover and the bottom cover; an inner cavity isolated from the front cavity is jointly enclosed by the yoke, the connector, the frame, and the diaphragm; a surface of the yoke away from the first magnet is fixed to the bottom cover.

2. The speaker module as described in claim 1, wherein the yoke comprises a body portion configured to support the first magnet, and an edge portion surrounding the body portion; a thickness of the edge portion is smaller than a thickness of the body portion; a surface of the body portion away from the first magnet is fixed to the bottom cover; the edge portion is spaced apart from the bottom cover.

3. The speaker module as described in claim 2, wherein the connector comprises a first fixation portion fixed to the yoke, a second fixation portion fixed to the frame, and a central portion connecting the first fixation portion and the second fixation portion; the first fixation portion is sandwiched between the edge portion and the bottom cover.

4. The speaker module as described in claim 3, wherein a total thickness of the edge portion and the first fixation portion is equal to the thickness of the body portion.

5. The speaker module as described in claim 4, wherein a surface of the first fixation portion away from the diaphragm is aligned with a surface of the body portion away from the first magnet.

6. The speaker module as described in claim 3, wherein a total thickness of the edge portion and the first fixation portion is smaller than the thickness of the body portion.

7. The speaker module as described in claim 6, wherein a groove is formed by denting a surface of the bottom cover facing the yoke away from the yoke; at least part of the body portion is received in the groove.

8. The speaker module as described in claim 7, wherein a depth of the groove is smaller than a thickness of the bottom cover.

9. The speaker module as described in claim 3, wherein an inner edge of the first fixation portion is abutted to the body portion.

* * * * *